Patented Aug. 8, 1939

2,169,098

UNITED STATES PATENT OFFICE 2,169,098

METHOD FOR SOFT SOLDERING ALLOYS CONTAINING ALUMINUM

Goodwin H. Howe, Scotia, N. Y., assignor to General Electric Company, a corporation of New York No Drawing. Application June 19, 1937, Serial No. 149,203

3 Claims. (Cl. 113—112)

The present invention relates to a method for soft soldering alloys containing aluminum and more particularly to a method for soft soldering permanent magnet alloys which consist essentially of iron, nickel and aluminum. Permanent magnet alloys of this type are disclosed in Ruder Patents No. 1,947,274 and No. 1,968,569. While such magnets, in general, consist essentially of iron, nickel and aluminum, they may contain additional elements such as cobalt, copper chromium manganese, tungsten, molybdenum, titanium and silicon.

It is frequently desirable to secure magnets of this type to a supporting member. Heretofore that has been accomplished mechanically. It has also been accomplished by copper brazing, by the use of hard solders, i. e., solders having a melting point in the neighborhood of 650° C., and by immersing the alloy magnet in a molten zinc bath having a temperature of about 450° C.

In copper brazing alloy magnets of the Ruder type, the temperature employed is about 1150° C., whereas with certain well known hard solders, the temperature required in the soldering operation is about 650° C. At these temperatures, however, neither the copper nor the hard solder flows easily on the alloy. Of the prior known methods for securing magnetic ferrous alloys containing aluminum to a supporting member that which comprises immersing the alloy in molten zinc has proved very satisfactory. The latter process, however, has the disadvantage that the junction between the zinc coated alloy and supporting member decreases in strength with age unless particularly pure zinc is used. Prior to the present invention it has been impossible, using the known fluxes for soft soldering, to wet the surface of alloys containing more than 5% aluminum with soft solder.

It is one of the objects of the present invention to provide a simple, low temperature method whereby alloys containing an appreciable quantity of aluminum and particularly magnetic ferrous alloys containing iron, nickel and aluminum as the basic ingredients may be coated with soft solder. By the expression "soft solder" I mean solder fusible at temperatures below about 370° C.

Although the present invention will be illustrated particularly in connection with permanent magnet alloys of the type disclosed in the above Ruder patents, the utility of the process is not limited to those alloys alone but may be employed in soft soldering any alloy containing up to about 14% aluminum.

In carrying out the present invention with an alloy containing iron, nickel and aluminum as the basic ingredients, I first remove the aluminum from the surface of the alloy. This may be accomplished in any one of several ways, for example by immersing the alloy in a hot hydrochloric acid solution or in a bath of molten potassium or sodium hydroxide. If a bath of potassium hydroxide is employed the alloy is immersed in the bath for about three minutes. Under such circumstances the hydroxide dissolves or removes the aluminum from the surface of the alloy. The removal of aluminum is effected without oxidation of the iron and without appreciable adverse effect on the magnetic properties of the alloy. The potassium hydroxide fluxes the de-aluminized surface and the alloy may be soft soldered immediately by immersing it in molten soft solder heated to about 360° C. Upon removal from the soft solder bath any caustic remaining on the surface may be removed by washing in water. A lead-tin solder consisting of about 94% lead and 6% tin having a melting point of about 300° C. is one example of a soft solder which may be employed.

If desired, however, lower melting point soft solders may be employed, for example, a fifty-fifty solder having a melting point of about 185° C. In the latter case the film produced on the alloy by immersing it in the potassium hydroxide preferably should be dissolved in water and a zinc chloride solution flux thereafter applied to the alloy before applying the soft solder thereto.

Instead of immersing the ferrous alloy in an etching medium such as molten potassium hydroxide, the surface of the alloy may be prepared by heating it to a temperature sufficiently high to melt a stick of potassium hydroxide held against it. However, a more uniform product is obtained by immersing the alloy in the molten hydroxide.

If a sodium hydroxide bath is employed to remove the surface aluminum the hydroxide should be heated to a temperature somewhat above its melting point, for example, about 360° C. for best results. Water solutions of either potassium hydroxide or sodium hydroxide also may be employed to remove or etch aluminum from the surface of a ferrous alloy containing the same but, since such solutions act slowly, it is preferable to employ the molten caustic.

Instead of potassium or sodium hydroxide, I may employ any strongly alkaline solution or, if desired, hydrofluoric acid or hydrochloric acid to remove the aluminum from the surface of ferrous or non-ferrous alloys. In using hydrocholric acid, I prefer to employ a hot 50% solution. Under such circumstances the pickling or de-aluminizing may be accelerated somewhat if about 5% of hydrofluoric acid is added to the hydrochloric acid bath. After the alloy has been immersed in an acid bath and the surface aluminum removed, the alloy is washed in water and then immersed in a suitable flux such as zinc chloride and thereafter immersed in the molten soft solder.

When alloys which contain aluminum and other ingredients, such as iron and nickel, are pickled in a hydrochloric acid solution each ingredient of the alloy is attacked to a certain extent by the acid. However, the acid attacks the aluminum preferentially, i. e., the action of the acid on the aluminum, which is the detrimental alloy ingredient so far as the soldering action is concerned, is far more severe than the action of the acid on the other ingredients. As a result, the aluminum is removed from the surface of the alloy to an extent sufficient to prevent any interference with the soft soldering.

While the present process is particularly adapted for soft soldering permanent magnets which consist essentially of iron, nickel and aluminum, it also may be applied successfully to non-ferrous alloys containing up to about 14% aluminum, for example, aluminum bronze and aluminum-nickel alloys. The low temperature employed in the soldering process does not adversely effect the properties of heat treated magnetic material and at the same time an unusually strong and reliable joint may be obtained between the solder and the magnet.

What I claim as new and desire to secure by Letters Patent of the United States, is:

1. The method for soldering an alloy containing iron, nickel and aluminum as the basic ingredients which comprises applying hydrochloric acid to the surface to be soldered to thereby remove the aluminum from said surface, thereafter applying a flux to said surface and finally applying a soft solder to said surface.

2. The method for soldering an alloy containing iron, nickel and aluminum as essential ingredients, which comprises applying to said alloy acid from the group hydrochloric and hydrofluoric, for a time sufficient to remove aluminum from the surface of said alloy and thereafter soft soldering said alloy.

3. The method for soldering an alloy containing iron, nickel and aluminum as essential ingredients which comprises immersing said alloy in a hydrochloric acid solution containing a few per cent of hydrofluoric acid and for a time sufficient to remove aluminum from the surface of said alloy and thereafter soft soldering said alloy.

GOODWIN H. HOWE.